United States Patent [19]

Mayr et al.

[11] 3,799,661

[45] Mar. 26, 1974

[54] ARRANGEMENT FOR DECREASING THE READY TIME IN A MOTION PICTURE CAMERA

[75] Inventors: Helmut Mayr, Taufkirchen; Richard Pelte; Theodor Huber, both of Munich, all of Germany

[73] Assignee: Agfa-Gevaert Aktiengesellschaft, Leverkusen, Germany

[22] Filed: Sept. 20, 1972

[21] Appl. No.: 290,996

[30] Foreign Application Priority Data

Sept. 21, 1971  Germany.......................... 2147074

[52] U.S. Cl. .............................. 352/141, 95/10 C
[51] Int. Cl. ........................................... G03b 7/08
[58] Field of Search ........ 352/141; 95/10 C, 10 CT, 95/10 CD

[56] References Cited
UNITED STATES PATENTS

| | | | |
|---|---|---|---|
| 3,383,566 | 5/1968 | Ciemniak......................... | 352/141 X |
| 2,353,218 | 7/1944 | Burnham ............................ | 355/68 |
| 3,592,538 | 7/1971 | Ukai ..................................... | 355/3 |
| 3,432,232 | 3/1969 | Tompkins ............................. | 355/8 |

*Primary Examiner*—Monroe H. Hayes
*Attorney, Agent, or Firm*—Michael S. Striker

[57] ABSTRACT

A stabilized cell is permanently connected to the voltage source through a high ohmic resistance. The high ohmic resistance is short-circuited when the exposure control circuit is connected to the stabilized cell. Sufficient forming current thus flows through the cell at all times to keep it in readiness for operation.

4 Claims, 1 Drawing Figure

3,799,661
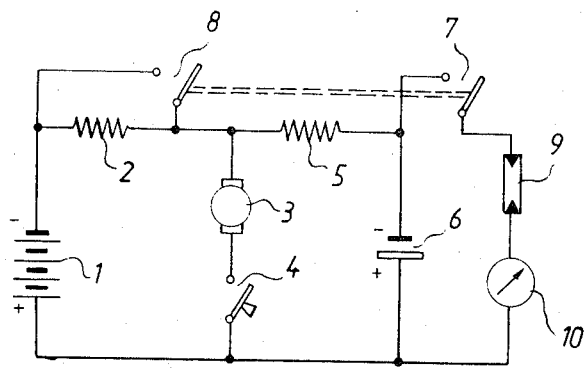
PF 763 / MF 1277

ARRANGEMENT FOR DECREASING THE READY TIME IN A MOTION PICTURE CAMERA

BACKGROUND OF THE INVENTION

This invention relates to motion picture cameras having an electromotor for driving gearing, the energy supply for the electromotor being a D.C. source. Further, the motion picture camera has an exposure control circuit of a conventional type the voltage applied to which is stabilized by a stabilized cell connected in parallel therewith.

The stabilized cells have an associated inherent capacitance, whereby variations in current are subjected to a buffering effect. In order to get a good stabilizing effect, stabilizing cells having a high inherent capacitance must be used. However, this has the disadvantage that the readiness time of such cells is relatively large. Thus, when the voltage source is first loaded down by the motor and by the exposure control circuit, a determined time period must elapse before the exposure control circuit has the proper voltage applied thereto. During this time of course any films that will be taken will be incorrectly exposed. Of course the readiness time can be decreased by using stabilized cells with a smaller inherent capacitance. However, in that case the voltage is not sufficiently stabilized under rapid current changing conditions, as for example when the motor is first connected to the supply.

SUMMARY OF THE INVENTION

The object of the present invention is to furnish an arrangement wherein a stabilized cell may be utilized with a short ready time without a corresponding decrease in the stability of the voltage furnished thereby.

Thus in the present invention, a motion picture camera has voltage supply means and exposure control circuit means. It further has stabilized cell means for stabilizing the voltage across said exposure control circuit means. High ohmic resistance means are connected in series with said stabilized cell means thereby forming a series circuit. Connecting means connects said series circuit across said voltage supply means. First switch means connect said exposure control means in parallel with said stabilized cell means when closed and second switch means short-circuit said high ohmic resistance means when said first switch means are closed.

In a preferred embodiment of the present invention mechanical intercoupling between the first and second switch means cause the same to be operated simultaneously.

Further, a protective resistance is interconnected between the high ohmic resistance means and the stabilized cell means. Electromotor means, specifically D.C. motor means, are connectable across the voltage supply means by means of third switch means.

The stabilized cell is chosen to have a high inherent capacitance thereby causing current variations which occur when the motor is first switched in not to be transmitted to the exposure control means.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

The single FIGURE shows a diagram of the arrangement of the present invention.

DESCRIPTION OF THE PREFERRED EMBODIMENTS

A preferred embodiment of the present invention will now be described with reference to the drawing.

In the FIGURE, the voltage supply means are a battery 1. This is connected via a high ohmic resistance 2 to a D.C. motor 3. The other terminal of D.C. motor 3 is connected to the positive side of the battery through third switch means 4. Connected in parallel with motor 3 is a circuit comprising a protective resistance 5 and a stabilized cell 6. Stabilized cell 6 has a high inherent capacitance. Exposure control circuit means may be connected in parallel with stabilized cell 6 through a switch 7 which is one embodiment of first switch means. The switch 7 is mechanically coupled to a switch 8, second switch means, which, when closed, short-circuit high ohmic resistor 2. The exposure control circuit means comprise a photosensitive element 9 as well as a rotating-coil-type measuring instrument 10.

It will be noted that a forming current always flows through the stabilized cell. When the photographer closes switches 7 and 8, the current flowing through the exposure control circuit means is a current which depends on the value of the resistance of photosensitive element 9. The photosensitive element is a photoresistor. Switch 8 of course directly connects protective resistance 5 to the voltage source under these conditions.

Subsequent closure of switch 4 by activation of the release contact causes motor 3 to be connected to the circuit. The sudden change in current drawn from battery 1 by the motor is not transmitted to the exposure control circuit because of the high inherent capacitance of stabilized cell 6.

The high ohmic resistance, resistor 2 in the FIGURE, may be a resistor of approximately $10^5$ ohms.

It should further be noted that the term stabilized cell used through this application is to be interpreted as meaning any cell which requires a forming current and which serves the purpose of maintaining a constant voltage across its terminals.

Without further analysis the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended We claim:

1. In a motion picture camera, in combination, voltage supply means; exposure control circuit means; stabilized cell means; high ohmic resistance means connected in series with said stabilized cell means, thereby forming a series circuit; connecting means directly connecting said series circuit in parallel with said voltage supply means; first switch means for connecting said exposure control circuit means in parallel with said stabilized cell means when closed; and second switch means connected in parallel with said high ohmic resistance means for short-circuiting said high ohmic resistance means when said first switch means is closed.

2. A motion picture camera as set forth in claim 1, further comprising protective resistance means interconnected between said high ohmic resistance means and said stabilized cell means.

3. A motion picture camera as set forth in claim 1, further comprising mechanical coupling means for intercoupling said first and second switch means for simultaneous operation thereof.

4. A motion picture camera as set forth in claim 1, further comprising D.C. motor means; and third switch means connecting said D.C. motor means to said voltage supply means when closed.

* * * * *